United States Patent [19]

Buchler

[11] Patent Number: 4,822,014
[45] Date of Patent: Apr. 18, 1989

[54] APPARATUS FOR HOLDING AN OBJECT IN A DESIRED POSITION IN SPACE

[75] Inventor: René Buchler, Sonnental, Switzerland

[73] Assignee: Buchler B-Set AG, Flawil, Switzerland

[21] Appl. No.: 85,293

[22] Filed: Aug. 13, 1987

Related U.S. Application Data

[63] Continuation of Ser. No. 912,164, Sep. 26, 1986, abandoned, which is a continuation of Ser. No. 684,146, Dec. 20, 1984, abandoned.

[30] Foreign Application Priority Data

Dec. 20, 1983 [CH] Switzerland ............... 6799/83
Jan. 26, 1984 [CH] Switzerland ............... 346/84

[51] Int. Cl.$^4$ ............................................. B23Q 1/04
[52] U.S. Cl. ........................................ 269/71; 269/309; 269/95
[58] Field of Search ................. 269/95, 98, 309, 71, 269/73, 315, 900

[56] References Cited

U.S. PATENT DOCUMENTS 1,318,688 10/1919 Paschall ..................... 269/95
1,365,536  1/1921 Neilsen .
1,405,670  2/1922 Craley .
1,407,015  2/1922 DeGlers .
2,861,485 11/1958 Padavano ................... 269/309
3,967,816  7/1976 Ramsperger et al. ......... 269/95

FOREIGN PATENT DOCUMENTS

1243946  6/1967 Fed. Rep. of Germany .
1421458 10/1964 France .
2381935  9/1978 France .
2462231  2/1981 France .
 154593  5/1932 Switzerland .
 140544  2/1917 United Kingdom .
 514542 11/1939 United Kingdom .
 659400 10/1951 United Kingdom .
1003294  9/1965 United Kingdom .
1602031 11/1981 United Kingdom .

Primary Examiner—Frederick R. Schmidt
Assistant Examiner—Judy J. Hartman
Attorney, Agent, or Firm—Wegner & Bretschneider

[57] ABSTRACT

An apparatus for holding an object in a desired location in space having a beam, the upper edge of which having channels. A lamellar component is present on this beam. The lower and upper sides of the component are each provided with a recess. The lateral faces of the lower recess are in engagement with the channels of the beam. The lateral faces of the upper recess engage into channels that are constructed in an angular carriage. A vise for gripping an object, for example, is present at one end of this carriage. The apparatus may be used on machine tools for retaining objects to be machined. In particular these may be machine tools on which the object is treated by electroerosion.

6 Claims, 11 Drawing Sheets

APPARATUS FOR HOLDING AN OBJECT IN A DESIRED POSITION IN SPACE

This application is a continuation of U.S. application Ser. No. 912,164, filed Sept. 26, 1986, now abandoned, which is a continuation of U.S. application Ser. No. 684,146, filed Dec. 20, 1984, now abandoned.

BACKGROUND OF THE INVENTION

The present invention relates to an apparatus for holding an object in a desired position in space, having at least two cooperating components, the first of these components, to which the object is attachable, exhibiting at least one elongate element.

DISCUSSION OF THE PRIOR ART

In a known apparatus of this type, the elongate element (shank) has a circular cross-section. Such a shank has the advantage that the distance from the object to be machined to the table upon which this apparatus is erected can be adjusted at will within the length of the shank. The shank of circular cross-section then has the further advantage that it can occupy any desired angular position. However, such a shank does have a disadvantage in that its use always necessitates a particular transmission piece from the remaining components of the apparatus that have channels and recesses.

DESCRIPTION OF THE INVENTION

One object of the present invention is to eliminate the aforementioned disadvantage of the known apparatus.

This object is achieved according to the invention in the apparatus of the type initially defined, wherein the apparatus has at least two cooperating components, the first component (to which the object may be attached) having at least one elongate element constructed as a carriage having an angular crosssection. The marginal parts of two opposite lateral surfaces of the carriage adjoining a common carriage surface are provided with channels and the second component of the apparatus has a recess for receipt of the profiled part of the carriage.

DESCRIPTION OF THE DRAWINGS

Exemplary embodiments of the present invention are explained more fully below with reference to the accompanying drawings, wherein.

DETAILED DESCRIPTION OF THE DRAWINGS

Figures 1, 2, 3:
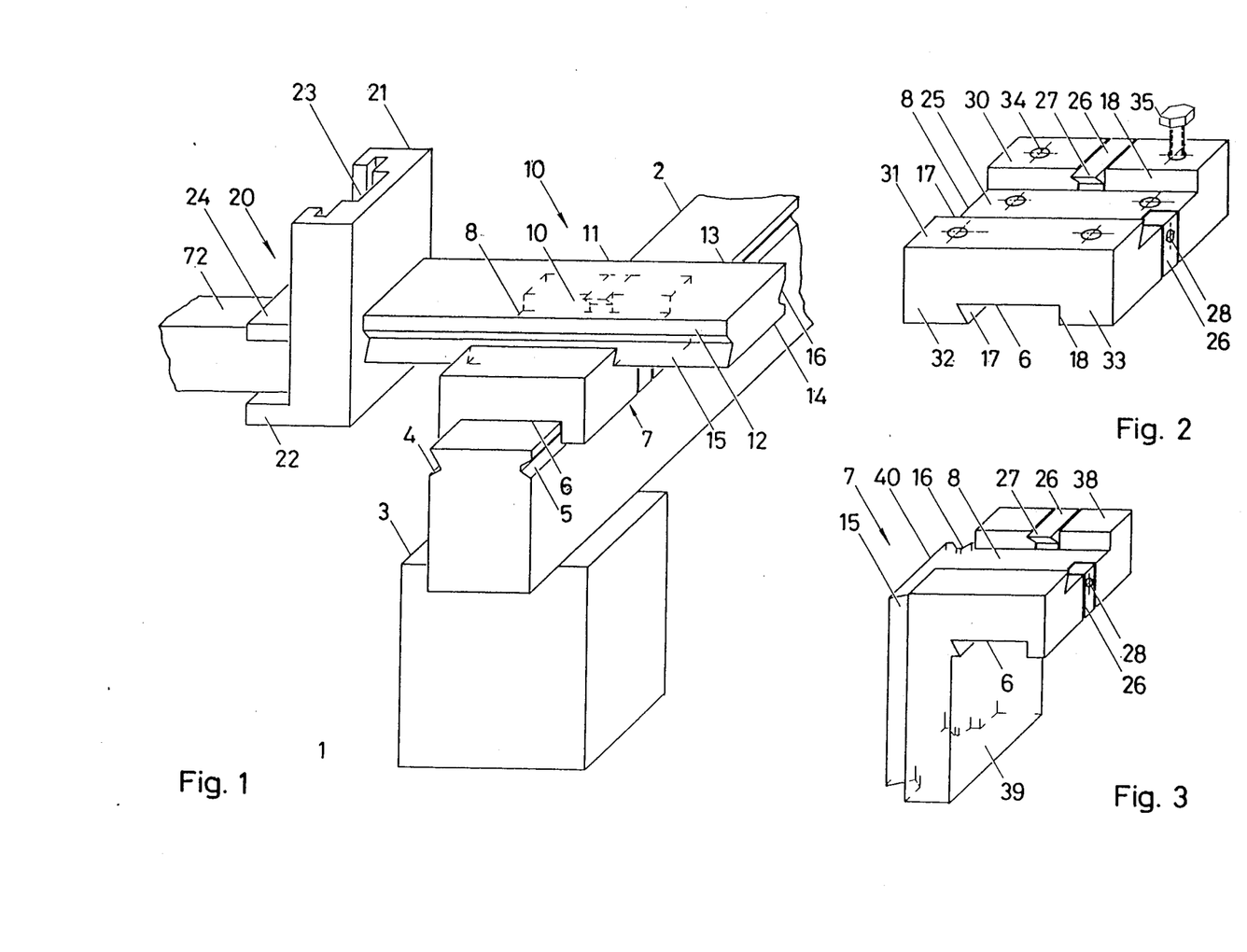
FIG. 1 shows in perspective a first embodiment of the present apparatus.
FIG. 2 shows in perspective a first embodiment of the second component of the apparatus according to FIG. 1.
FIG. 3 shows in perspective a second embodiment of the second component of the apparatus according to FIG. 1.

In FIG. 1, the reference numeral 1 designates a foundation, upon which the present apparatus is erected. This foundation may be a machine table, a table of the preliminary adjustment station, or the like. A beam 2 is provided, which rests upon legs 3, which are fastened on the foundation 1 in a manner generally known. Only one of the legs 1 is illustrated in FIG. 1. The upper part of the beam 2 has grooves 4 and 5, which are constructed in mutually opposite marginal parts of the beam 2. The marginal part of the beam 2 formed in this way is located in the recess 6 of one of the components 7 of the present apparatus, which additionally has a second recess 8. Component 7 is somewhat laminar and the two recesses 6 and 8 enclose an angle of approximately 90° in the example illustrated. The axes of the recesses, however, also may be oriented parallel or enclose any desired other angle.

A component 10 of the present apparatus has an elongate element 11, which is henceforth also called the carriage. The cross-section of this carriage 11 is substantially angular. In the example illustrated the carriage 11 is comparatively flat. However, the carriage 11 may also have a square cross-section, for example, or it may also stand on edge in the recess 8 of component 7. The two vertical side walls 12 and 13, which adjoin the underside 14 of the carriage 11, are provided with channels 15 and 16 in their lower parts. These channels 15 and 16 are in engagement with the correspondingly shaped lateral walls 17 and 18 of the recess 8. A more detailed description of both the channels 4, 5 and 15, 16, and of the recesses 6 and 8, together with the locking means for the profiled parts located in the respective recess 6 or 8 is found in European patent application No. 83810610.2, for example. Henceforth the component 10 provided with the carriage 11 will be designated as the first component, and the component 7 exhibiting the recess 8 will be designated as the second component.

A basic element 20, which is constructed as a vise in the example illustrated, is present at one end of the carriage 11. The block 21 of the vise may be either screwed or welded to the end face of the carriage 11. The block 21 terminates underneath in a projecting flat part 22, which serves as a fixed jaw of the vise 20. A flat, vertically oriented depression 23, open in front at the center, in which a cullis block (not shown) can move, is constructed in the block 21. The movable jaw 24 of the vise 20 is attached to this cullis block. The movable jaw 24 can be moved along the block 21 by means of a screw-threaded spindle (not shown).

The second component 7 used according to FIG. 1 is illustrated in more detail in FIG. 2. It is clear from FIG. 2 that one of the lateral walls 17, or one of the flanks of the relevant recess 6 or 8, is relieved, whereas the other lateral wall 8 is oriented virtually at right angles to the bottom 25 of the relevant recess 6 or 8. A vertically oriented depression, in which a pawl 26 is present, is constructed in each marginal part of the second component 7 which adjoins the flank 18, oriented at right angles, of the recess 6 or 8. This pawl has a protruding nose 27 which is pressed against the bottom part of the corresponding channel 5 or 16 when the screw 28, by means of which the pawl 26 is connected to the remaining part of the second component 7 of the present apparatus, is tightened.

The marginal parts 30, 31, 32 and 33 of the lamellar second component 7 have, in the region of the relevant recess 6 or 8, continuous tapped bores 34 into which screws 35 can be engaged. Only one of these screws 35 is illustrated in FIG. 2. The screws 35 pass through the plate so that their points rest upon the surface of the beam 2 located there beneath or upon the underside 14 of the carriage 11. By tightening the screws 35, those parts of further components of the present apparatus that are present in the recesses 6 or 8 are expelled from these recesses. The degree of this action can be selected by the tightening of the screws 35. Thus, the position of the components of the present apparatus relative to each other can be modified within limits which, although small, are adequate for the existing purposes.

A further embodiment of the second component 7 of the present apparatus is illustrated in FIG. 3. Component 7 is substantially L-shaped in vertical section, so that it has a first, horizontal member 38 and a second, vertical member 39. The horizontal member 38 is of substantially identical construction to the lamellar second component of FIG. 2. The underside of the horizontal member 18 contains the first recess 6 already discussed, and its upper side contains the second recess 8, the pawls 26 with the noses 27 and the fastening screws 28 being associated with these recesses. The outside of the vertical member 39 of this L-shaped component contains a projection 40, in the lateral walls of which the channels 15 and 16 already discussed are constructed. Such a projection 40 can therefore be located in the recess of a further component of this apparatus. Such an arrangement of the projection 40 with the channels 15 and 16 therefore permits further positions of the object in space in a simple manner.

Figures 4, 5:
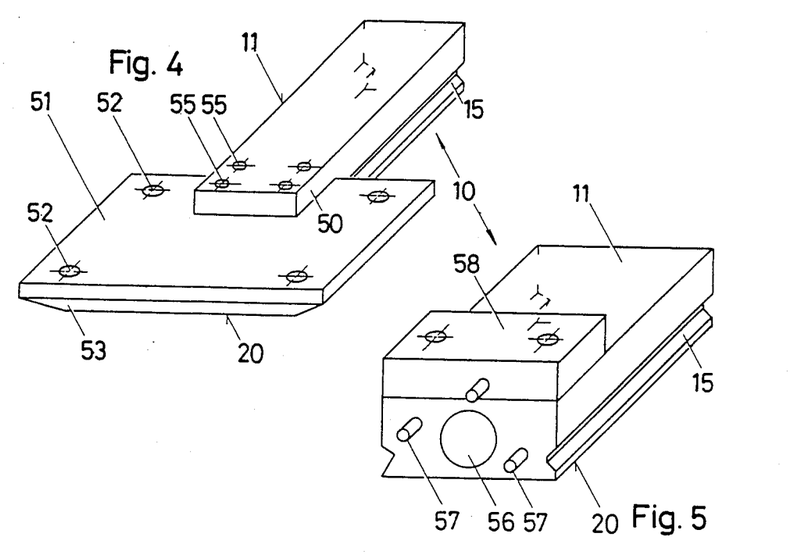
FIG. 4 shows in perspective a first embodiment of the first component of the apparatus according to FIG. 1.
FIG. 5 shows in perspective a second embodiment of the first component of the apparatus according to FIG. 1.

A further embodiment of the first component 10 of the present apparatus is illustrated in FIG. 4. This component 10 again has the carriage 11, the end of which is bifurcate. Between the tines 50 of such a bifurcate end, a plate 51 is located, upon which the object can be erected. Screws (not shown) to fasten the object upon the plate 51 can be screwed into tapped holes 52 constructed in the upper side of this plate 51. The underside of the plate 51 is constructed with an all-round bevel 53, which reduces the danger of collision by this plate with any possible further parts of the machine. Tapped holes 55, into which screws may be engaged corresponding to the adjusting screws already discussed, are constructed in the tines 50 of the carriage 11. The tapped holes 55 are located in the corners of a square. This permits a simple adjustment of the position of the plate 51 relative to the shank 11, both in the left-right direction and in the front-rear direction.

As shown in FIG. 5 the end face of the carriage 11 is provided with a circular aperture 56, which serves to receive the shank of circular cross-section which has been discussed supra. This measure permits the attachment of both components to an apparatus having a circular shank, and as are described more fully in the aforementioned European Patent Application. Protruding pins 57, which are placed around the aperture 56, serve as stops for the adjustment of the desired angular position of the circular shank. If the angular carriage 11 is too thin, it may have fastened to it, detachably, an auxiliary plate 58 which carries one of the stop pins 57.

Figure 6:
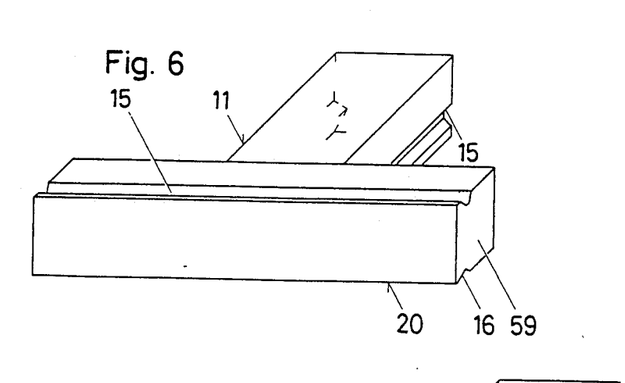
FIG. 6 shows in perspective a third embodiment of the first component of the apparatus according to FIG. 1.

The basic element 20, which is attached to the carriage, may also be of parallelepipedic construction, as illustrated in FIG. 6. The front part of such a parallelepiped 59 may have channels 15 and 16 already discussed, so that this part may serve as the guideway for a further component of the present apparatus.

Figure 7:
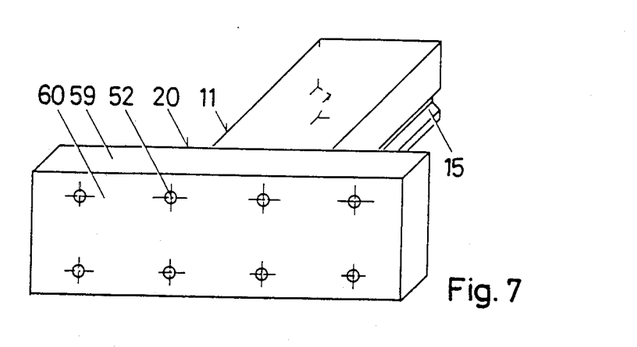
FIG. 7 shows in perspective a fourth embodiment of the first component of the apparatus according to FIG. 1.

The first component illustrated in FIG. 7 has a parallelepipedic base element 59, the front side 60 of which is provided with tapped holes 52. As previously discussed, screws may be engaged into the latter to fasten the object to the front side of the base element 59.

Figure 8:
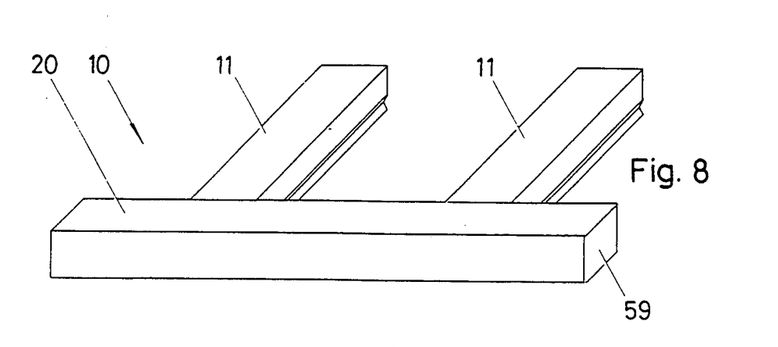
FIG. 8 shows in perspective a fifth embodiment of the first component of the apparatus according to FIG. 1.

FIG. 8 shows the first component of the present apparatus, which is provided with two carriage 11. In this case, the parallelepipedic basic element 50 may be comparatively long, so that either long objects, or even a plurality of objects, or a plurality of further components of the present apparatus, may be attached to it.

Figure 9:
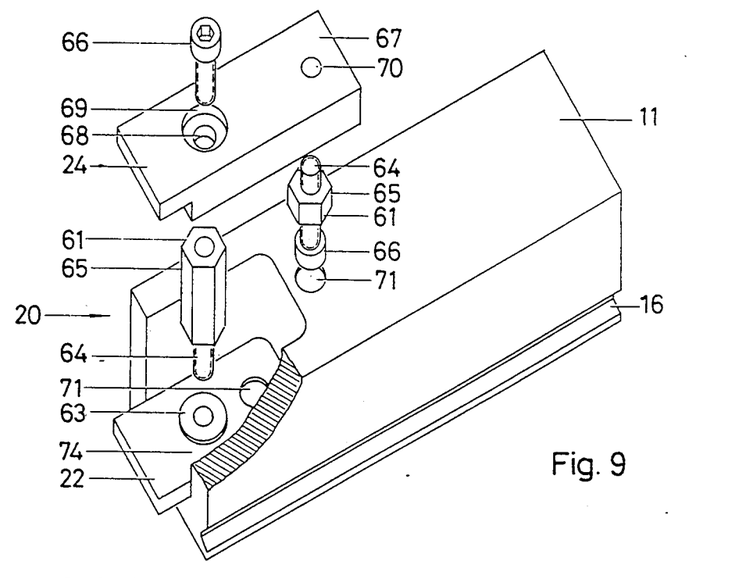
FIG. 9 shows in perspective a further embodiment of a vise according to FIG. 1.

FIG. 9 shows a vise 20 which is largely integrated in the element of the carriage 11. The front end part of the carriage 11 has a cavity 62 which is machined from in front and from above into the material of the carriage 11. The bottom part 74 of the cavity 62 is prolonged so that it protrudes from the region of the cavity 62 and forms the lower fixed jaw 22 of the vise. The surface of the bottom part 74 of the cavity 62 is provided with a screw-threaded eye 63.

A screw-threaded pin 64, which forms an entity with a bushing 65, may be engaged into the screw-threaded eye 63. This entity is also designated here as the distance piece 61. The outside of the bushing 65 is hexahedral, which makes it possible to tighten the screw-threaded pin 64 of the distance piece 61 in the screw-threaded eye 63. The inside of the other end part of the bushing 65 is likewise provided with a screw-thread, into which a screw 66 can be engaged, the cylindrical head of which is provided with a female hexagon.

A stirrup 67, which contains the movable jaw 24 of the vise, may be present between the head of the last-mentioned screw 66 and the bushing 65. In the example illustrated, the jaw 24 is constructed as a tab which stands out from the remaining part of the stirrup 67 and is flush with a principal surface of the stirrup 67. The stirrup 67 exhibits in proximity of the jaw 24 a first aperture 68, through which the screw 66 can pass. A countersink 69 is constructed at the top and bottom in the regon of the first aperture 68 in the stirrup 67. The head of the screw 66 can be accommodated in the countersink 69, so that the head does not project out of the relevant principal surface of the stirrup 67. A tapped hole 70 is constructed in the opposite end part of the stirrup 67, into which the screw-threaded pin 64 of a second distance piece 61 can be engaged. The screw 66 having the female hexagon, already mentioned, is engaged into the bushing 64 of this second distance piece 61. The head of this scew 66 comes to lie in a depression 71, which is constructed in the surface of the carriage 11 and which centers the screw head. The same depression 71 is also constructed in the upper side of the bottom part 74 of the cavity 62.

Figure 10:
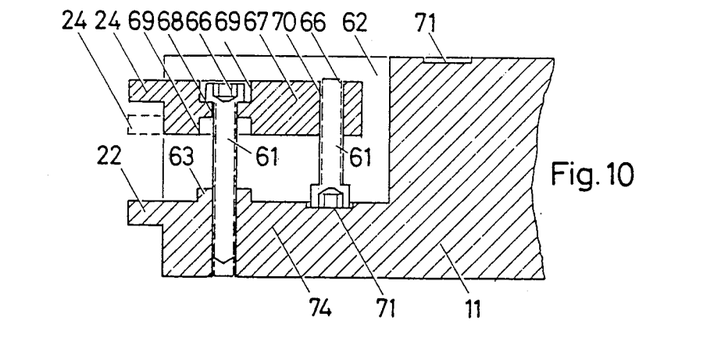
FIG. 10 shows in a vertical section a detail of the vise of FIG. 9.

By appropriately tightening the screw 66 in the front distance piece 61, the desired distance necessary to clamp a workpiece between the jaws 22 and 24, but also the force required for that purpose, can be obtained. The form of construction of the stirrup 67 and of the distance pieces 16, which are suitable for maintaining large objects, is illustrated in FIG. 9, FIG. 10 shows, by contrast, a construction of the stirrup 67 that is suitable for small workpieces. The length of this stirrup 67 is smaller than the depth of cavity 62 in the axial direction of the carriage 11, so that this stirrup 67 can be accommodated in the cavity 62. This distance between the jaws 22 and 24 can be extremely small. The latter can be reduced still further by rotating the stirrup 67 so that the movable jaw 24 is placed underneath, as indicated by dash lines in FIG. 10. The fixed jaw 22 of the vise 20 may also be constructed as a tab, as may be seen from FIG. 10.

Because the distance between the now short stirrup 67 and the bottom part 74 of the cavity 62 is small, the screws 66, each with female hexagon in their heads, are sufficient for the attachment of the stirrup 67 to the carriage 11. The rear screw 66 is engaged from beneath into the tapped hole 70 of stirrup 67. The distance from the underside of the stirrup 67 to the upper side of the head of the screws 66 should coresspond as far as possible to the desired distance between the jaws 22 and 24. The head of the rear screw 66 is now inserted into the depression 71 in the bottom part 74. The front screw 66 is now inserted from above into the front aperture 68 in the stirrup 67 and is then screwed into the screw-threaded eye 63.

Figures 11, 13, 14:
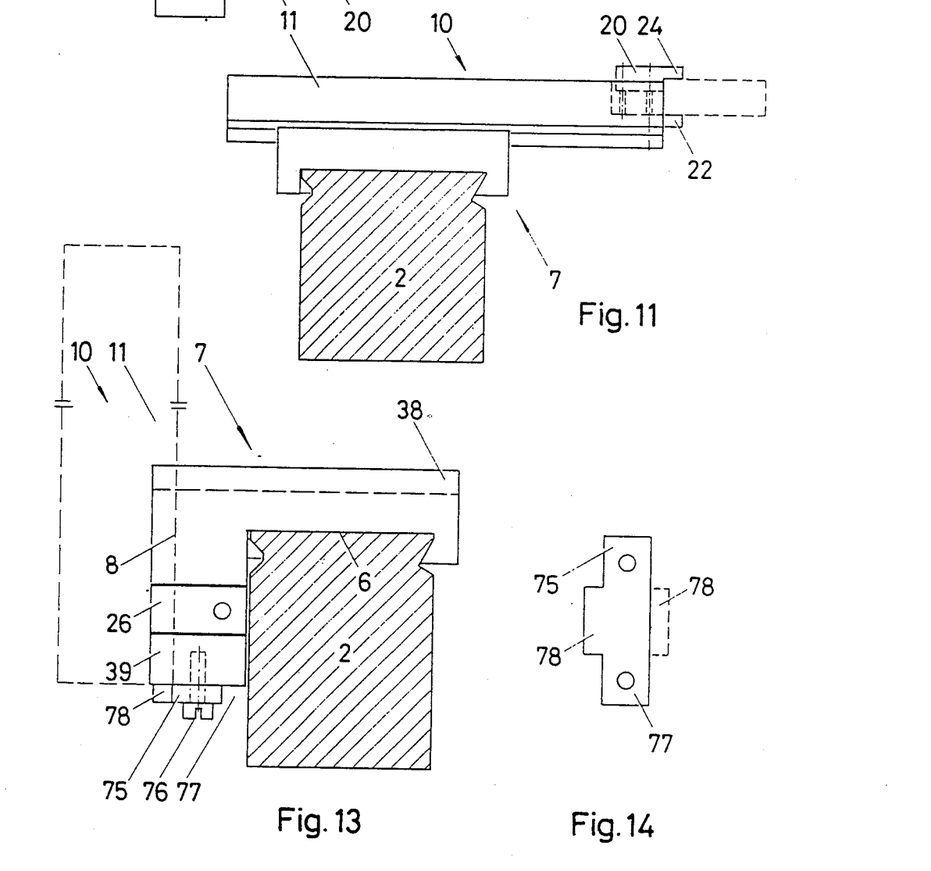
FIG. 11 shows the vise which has been inserted into the first component of the apparatus.
FIG. 13 shows in a side elevation a further possible embodiment of the component of the apparatus according to FIG. 3.
FIG. 14 shows a stop of the component according to FIG. 13.
Figure 12:
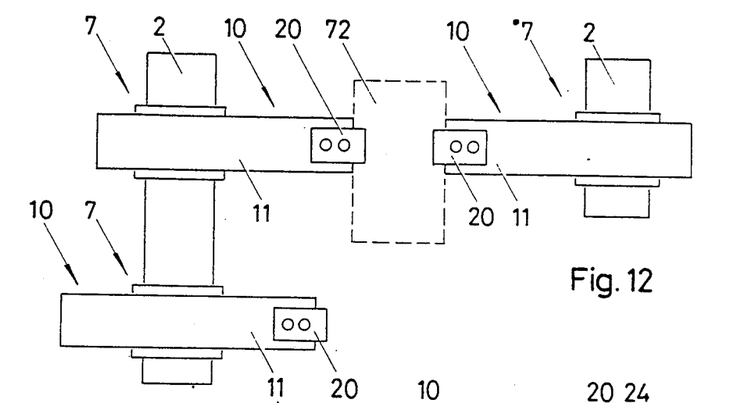
FIG. 12 shows a possibility for using a plurality of vises according to FIG. 11.

Such a vise 20 on the first component 10 of the apparatus can be attached to the beam 2 through a lamellar second component 7 of the apparatus, as can be seen from FIG. 11. However, a plurality of groups consisting of the first component 10 and the plate 7 may be arranged on the same beam 2 (FIG. 12). However, a plurality of beams 2 may also be placed mutally opposite, so that the workpiece 72 can be retained from two or more sides.

A further embodiment of the second component 7 of the present apparatus, which is illustrated in FIG. 13, very closely resembles the component shown in FIG. 3. In the present case, the vertical member 39 of this L-shaped component 7 has a recess 8, into which the carriage 11 of the first component 10 of the apparatus, for example, can be inserted. For the purpose of clamping the carriage 11, the member 39 is provided with pawl 26, which can be pressed against the carriage 11 by means of screw 28. In order to prevent the carriage 11 from sliding through downwards when the pawl 26 is not tightened, the lower end of the vertical member 39 is provided with an adjustable stop 75, which may be maintained in position by means of screws 76. The stop 75 is produced from a flat piece of material, and it has both a principal part 77 and a branch 78 laterally adjoining the principal part (FIG. 14). The principal part 77 is fastened by the screws 76 to the lower front face of the member 39. The branch 78, on the other hand, can project into the region of the recess 8 in the member 39. According to FIG. 11, the carriage 11 rests on the branch 78. When it is desired to lower the carriage 11 further, the stop 75 is rotated so that the branch 78 is located to the right, as indicated by dashed lines in FIG. 14.

Figures 15, 17:
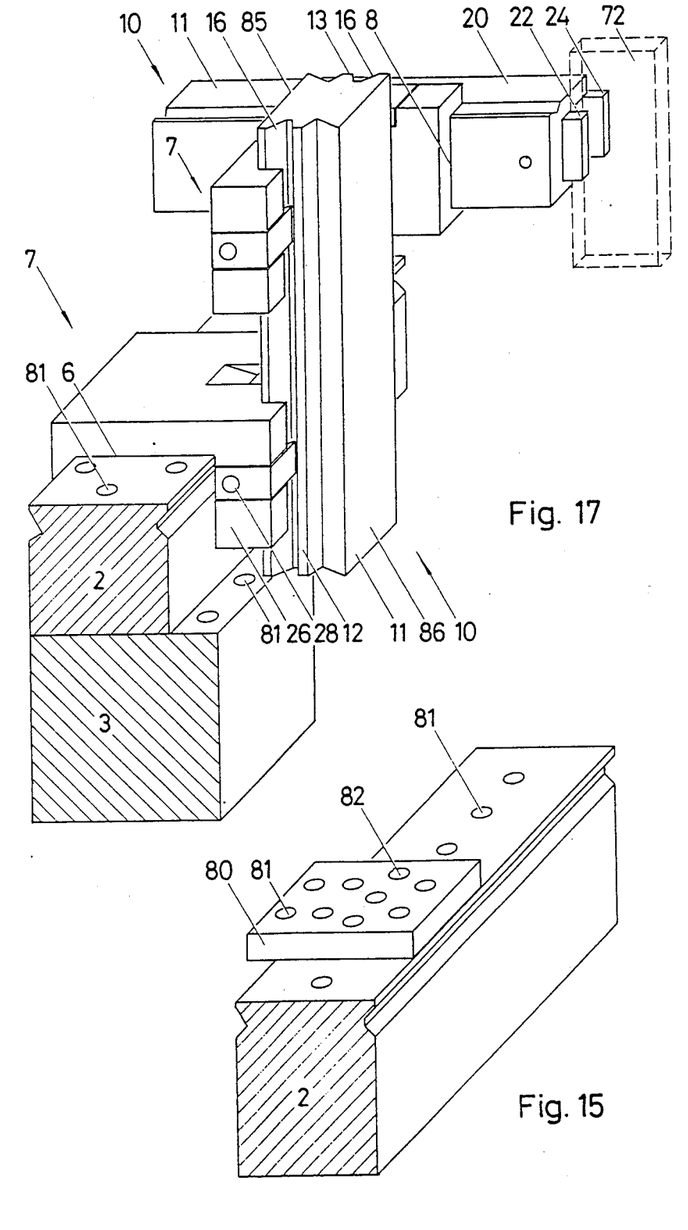
FIG. 15 shows in perspective components of the apparatus that have tapped holes to permit the components to be connected by means of screws.
FIG. 17 shows a first association of the components of the apparatus for the purpose of obtaining a maximally collision-free holding of the workpiece.
Figure 16:
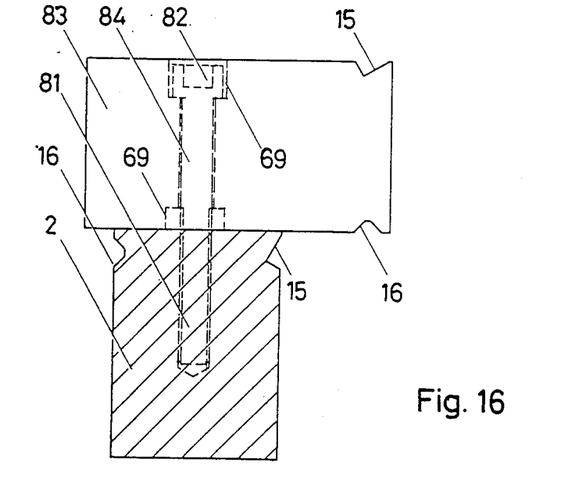
FIG. 16 shows two components of the apparatus that are mutally connected in the manner shown in FIG. 15.

It will be seen from FIG. 15 that the individual components 2, 80 etc. of the present apparatus may be provided with bores or tapped holes 81, through which screws 82 can pass. These screws 82 then hold together the mutually superposed parts 2, 80 etc. of the apparatus. The advantage of such a connection of the components of the apparatus lies in the fact that the position of the components relative to each other need not be at right angle. FIG. 16 shows a customary beam 2, upon which a short beam 83 is present. A continuous bore 84 extends between the lateral walls of the short beam 83. Through this bore 84, the short beam 83 is connected firmly to the beam 2 by means of the screw 82 according to FIG. 15, and the short beam 83 may form an angle other than 90° with the lower beam 2.

FIG. 17 shows an example of an arrangement of the abovementioned parts. Supported on the legs 3 is the beam 2, upon which the L-shaped component 7 with a lateral recess 8 is longitudinally slidable. The lateral recess 8 is occupied by a first marginal part 85 of the carriage 11 of the first component 10, while the marginal part 85 has channels 15 and 16. In this case, the opposite marginal part 86 of the carriage 11 is provided also with a pair of channels 15 and 16. As illustrated, similar channels 15 and 15 or 16 and 16 are constructed in the same lateral face of the carriage 11 in each case. However, channels 15 and 16 of a different type may also be constructed in the same lateral face of the carriage 11.

According to FIG. 17, a further section of the first marginal part 85 of the carriage 11 is in engagement with the inner recess 6 of a further L-shaped component 7. The lateral recess 8 of this second L-shaped component 7 is occupied by a further carriage 11 having the jaws 22 and 24 of the vise 20, between which a workpiece 72 is clamped.

Figure 18:
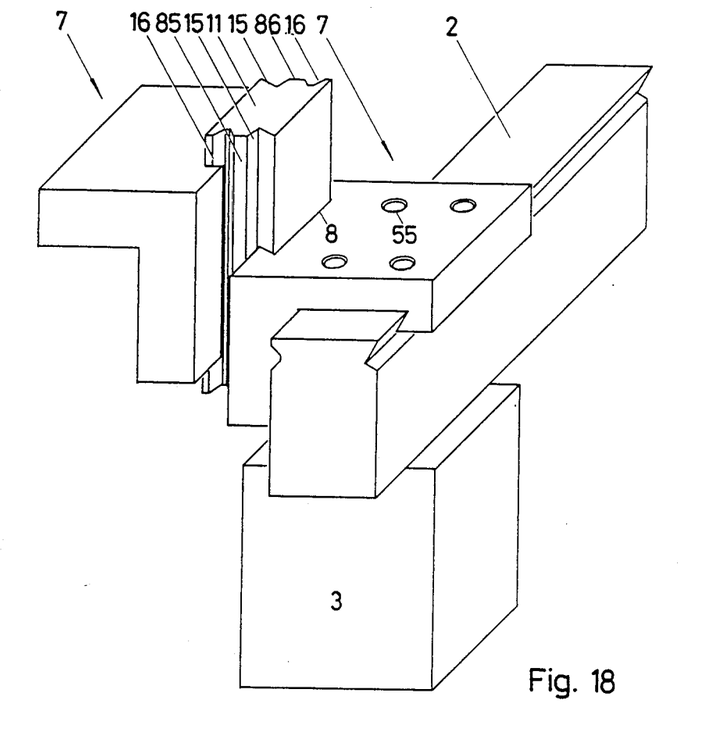
FIG. 18 shows in perspective a further possibility of connecting the components.

According to FIG. 18, two second components 7 with lateral recess 8 can be mutually connected by means of the carriage 11 with pairs of channels on two of its edges 85 and 86. The two mutually opposite marginal parts 85 and 86 of the carriage 11 are in engagement with the recesses 8 in the second L-shaped components 7 of the present apparatus.

Figure 19:
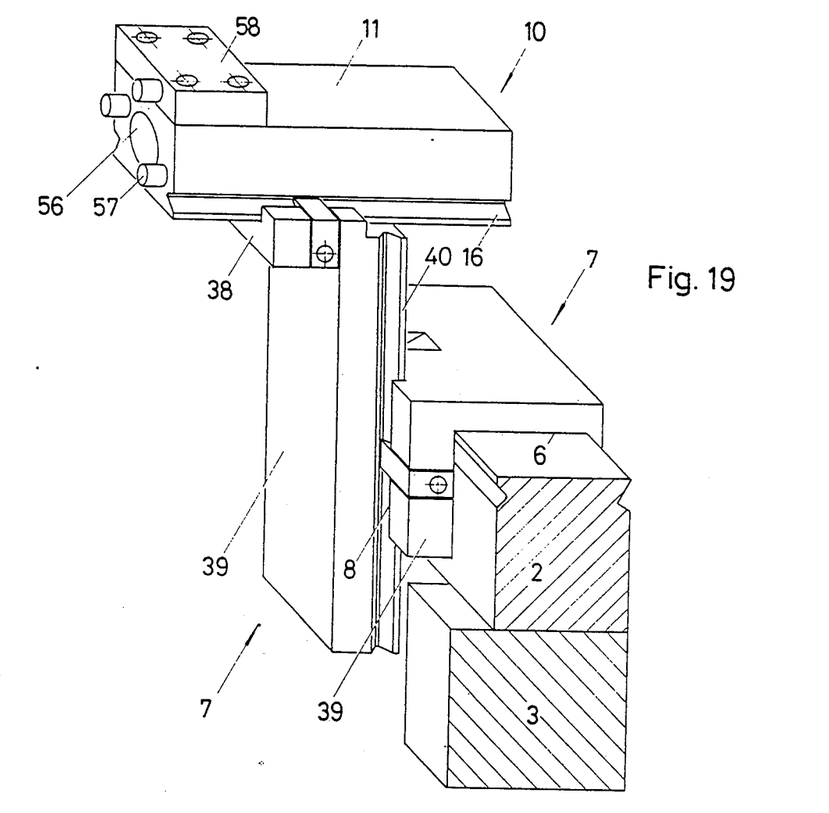
FIG. 19 shows a second collision-free association of the components of the apparatus.

According to FIG. 19, the L-shaped second component 7, having a lateral recess 8 in the vertical member 39, is in engagement through its inner recess 6 with the beam 2. The vertical recess 8 is occupied by the projection 40 of a second L-shaped component 7, which is illustrated in FIG. 3. The first component 10 illustrated in FIG. 5 of the present apparatus occupies the lateral recess 8 of this further L-shaped component 7. This component 10 has a carriage 11, one end part of which has aperture 56 to receive a shank.

Figure 20:
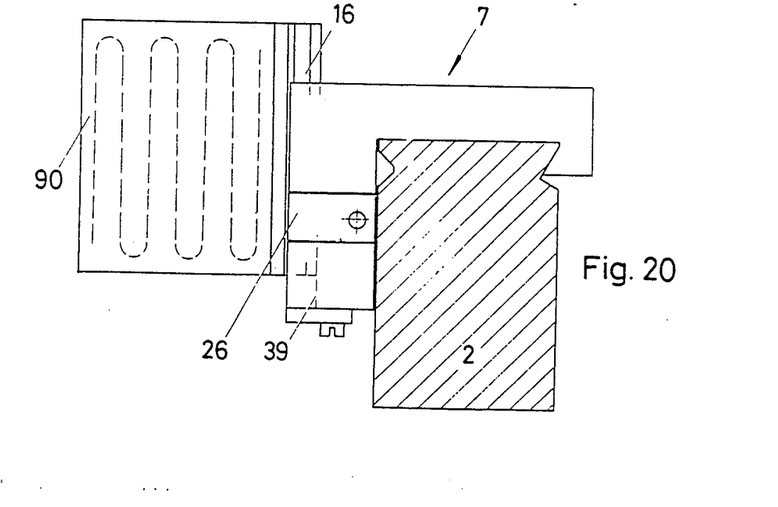
FIG. 20 shows the holding of a magnet flange.

As can be seen from FIG. 20, a magnet flange 90, known per se, may also be retained in the lateral recess 8 of the L-shaped component 7, if its marginal part is provided with the channels 15 and 16.

Figures 21, 22, 24:
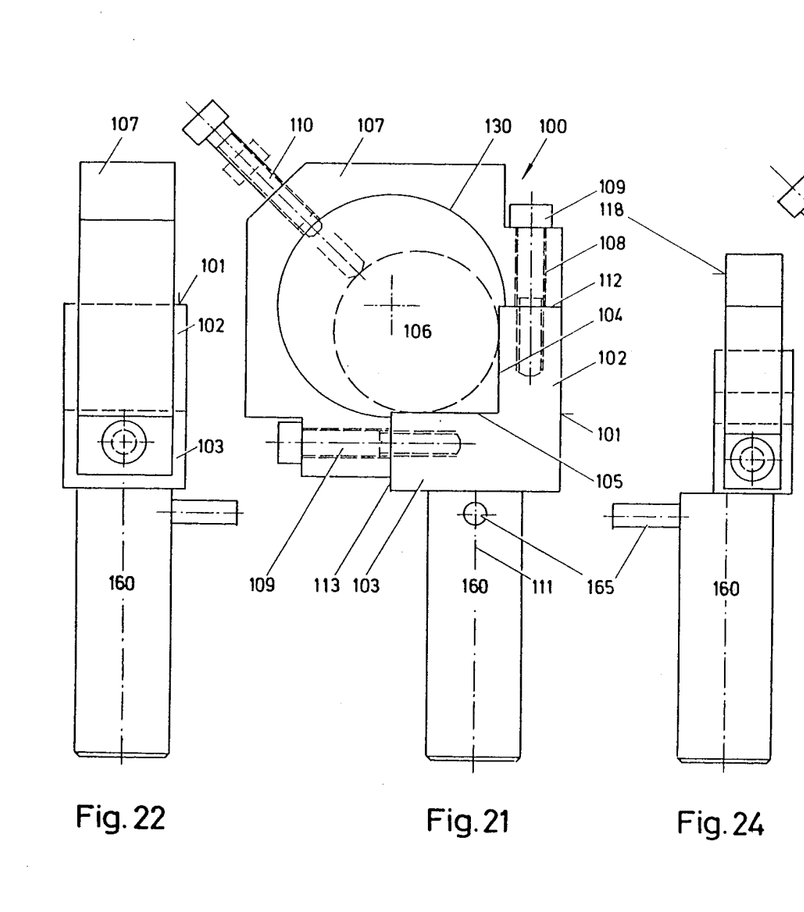
FIG. 21 shows in plan view a shank component of the present invention that has a prism.
FIG. 22 shows in side elevation the component of FIG. 21.
FIG. 24 shows in side elevation the component of FIG. 23.
Figure 23:
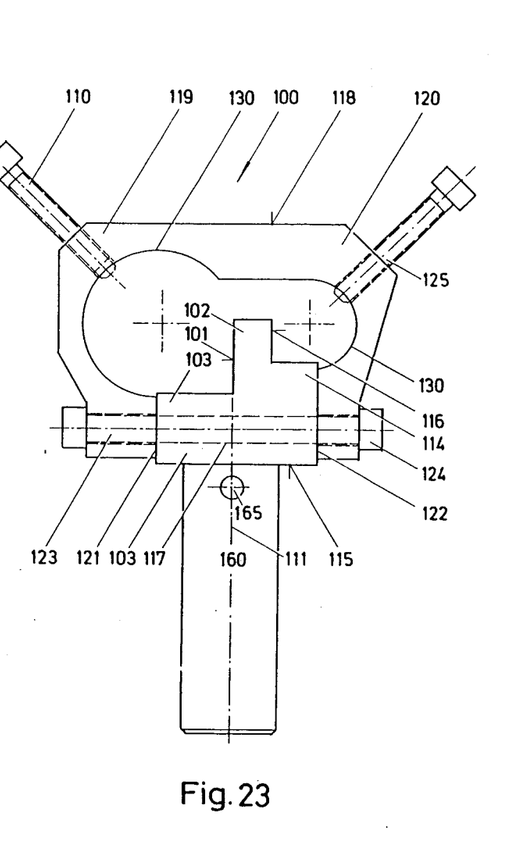
FIG. 23 shows in plan view a second embodiment of the component of FIG. 21 with a prism.

A component having the shank may also be constructed as a component 100 having a prism (FIGS. 21 to 24). The prism 101 is attached to the shank 160. This prism has two members 102 and 103, which have support surfaces 104 and 105, upon which the workpiece 106 rests. The two members 102 and 103 are of rectangular cross-section and they exhibit end faces 112 and 113 (FIGS. 21 and 22). The end faces of the end parts of a yoke 107 are butted upon the end faces 112 and 113. The end parts of this yoke 107 are provided with holes 108, through which screws 109 pass. The ends of the screws 109 are engaged into the members 102 and 103 of the prism 101, so that a firm entity results. The object 106 is pressed against the support surfaces 102 and 103 by means of a further screw 110, so that it cannot move during machining. An important feature of this prism 101 lies in the fact that the surface of one of the supports 104 is oriented parallel to the axis 111 of the shank 6, whereas the surface of the second support 105 stands at right angles thereto. The advantage of such a prism 101 lies in the fact that the one support surface 102 always coincides with the axis 111 of the shank 6. In this case, it is relatively simple to arrange the workpieces 106 relative to the coordinate system of the machine tool.

The prism described is, however suitable only for workpieces having a comparatively large diameter.

FIGS. 17 and 18 show a prism which is suitable for use for both thicker and extremely thin workpieces. The basic constituent 115 of this component of the apparatus comprises a first prism 101 of the size already described, and a second prism 116, the members 102 and 114 of which are smaller than the members 102 and 103 of the first prism 101. The double prism 115 has a horizontally oriented bore 117, which is provided with a screwthread. Associated with this basic constituent 115 is a double yoke 118, which is substantially U-shaped. This yoke 118 has two parts 119 and 120 having apertures of different diameter. The section 119 of the yoke 118 of greater diameter is associated with the larger prism 103, and the section 120 with the smaller diameter is associated with the smaller prism 116. The end parts of the U-shaped yoke 118 are butted onto the vertically oriented lateral faces 121 and 122 of the double prism 115, and fastened to the prism 115 by means of screws 123 and 124. The yoke 118 has screws 110 and 125 for clamping workpieces. In addition, the yoke 118 can be pivoted about the screws 123 and 124 for cleaning purposes, after these screws have been loosened.

In the exemplary embodiments of the shank component illustrated in FIGS. 21 and 24, the contour of the apertures 130 in the respective yoke 107 or 118 is of a circular construction. It is, however, to be understood that the contour of the apertures 130 may also be angular, which may present considerable advantages in the production of the yoke 107 and/or 118.

Figures 25, 26, 27:
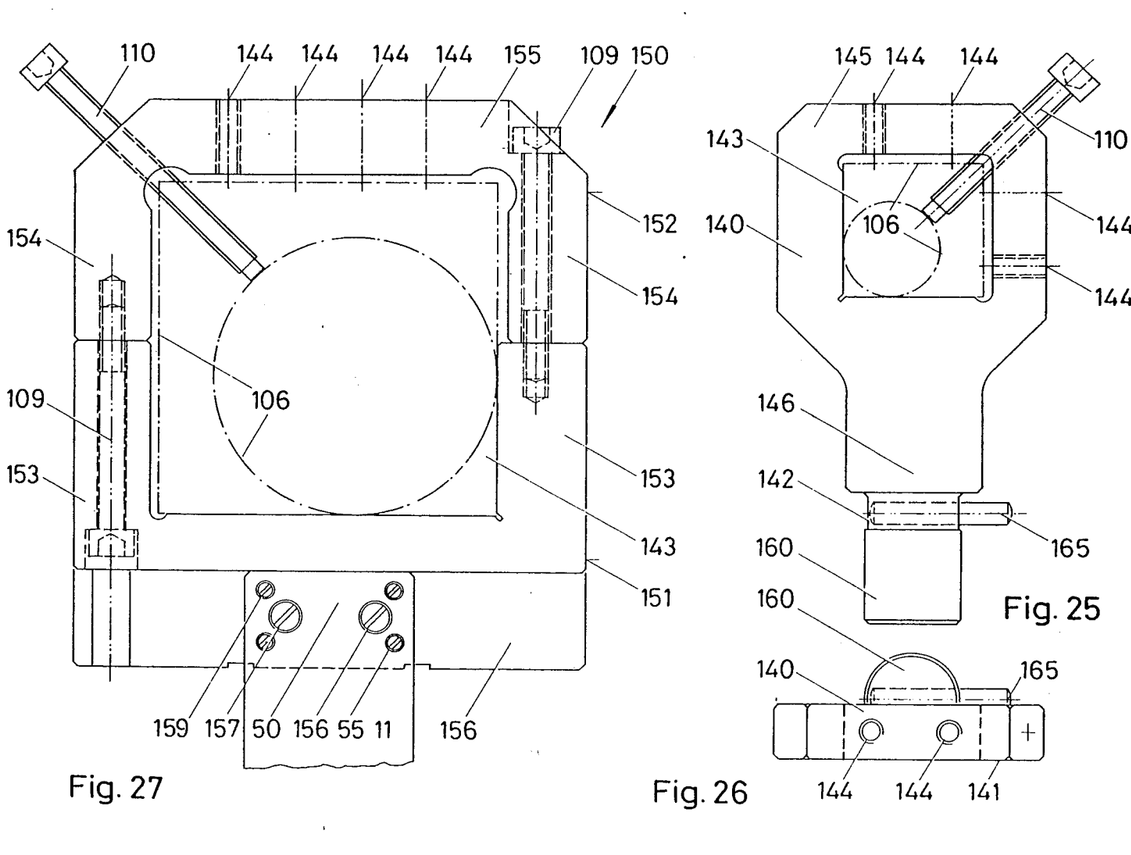
FIG. 25 shows in side elevation a further variant of the shank component having a yoke with a square aperture.
FIG. 26 shows in plan view the component of FIG. 25.
FIG. 27 shows in side elevation the shank component having a square yoke, attached to a profiled carriage.

FIGS. 25 and 26 show a further component with prism 140 corresponding to the components shown in FIGS. 21 to 24. In this case, however, the prism 140 is a single piece. The prism or else the part 140 for holding a workpiece 106 is substantially flat, as can be seen in particular in FIG. 26. Such a holding part 140 is attached to shank 160 in such a way that one of the lateral faces 141 of the part lie tangential to the circumferential surface of shank 160. The longitudinal axis of pin 165 on shank 160, located at right angles to the surface of shank 160, lies in a plane that is oriented parallel to the lateral face 141 of the holding part 140. The pin is embedded in the shank 160 in the region of a neck 142.

The aperture 143 for receiving the workpiece 106 is square, so that not only circular but also angular workpieces 106 can be held with the aid of such a component. For fastening the workpiece 106 in the prism 14, two screws (not shown) are utilized, which can be screwed into the tapped holes 144 constructed in the upper part 145 of the prism 140. The axes of the tapped holes 144 lie on either side of the center axis 146 of the receiving aperture 143, so that the workpiece 106, positioned with the aid of the pressing screw 110, can be fixed with the aid of the two screws mentioned.

In the case of the component shown in FIG. 27, the prism 150 is constructed as a double prism, similar to the case of the components of FIGS. 21 to 24. Unlike these components, however, the aperture 143 for receiving a workpiece 106 is angular or square in this case. This prism 150 consists of two approximately U-shaped halves 151 and 152, the members 153 and 154 of which are connected to each other by means of connecting screws 109. The head of the first screw 109 lies in the lower prism half 153 and the head of the second screw 109 lies in the upper prism half 154. This prism 150 also contains pressing screw 110 for positioning workpiece 106. Since the sides of the square receiving aperture 143 are relatively long, the upper section 155, i.e. the web of the upper prism half 152 is provided with several, in the example shown with four, tapped holes 144 for receiving fixing screws.

Figures 29, 30:
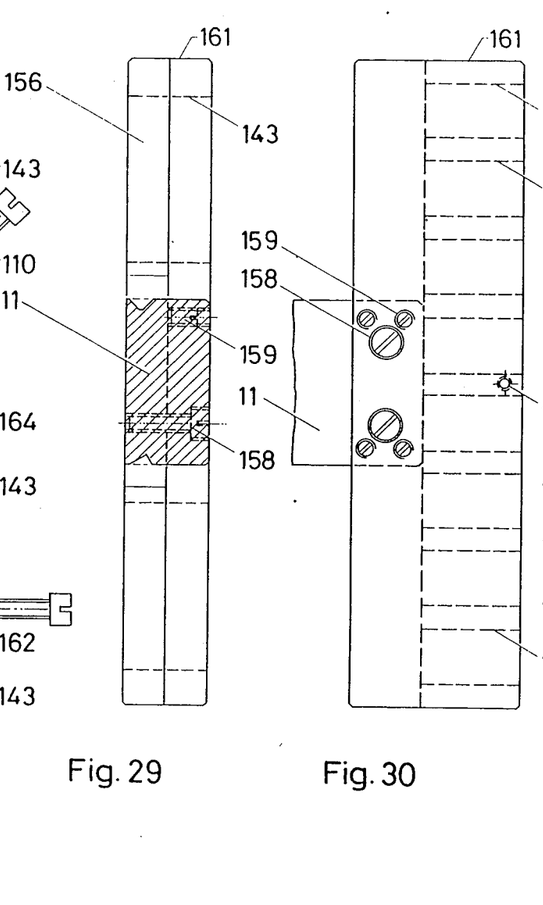
FIG. 29 shows a rear view of the component of FIG. 28.
FIG. 30 shows in plan view a component of FIGS. 28 and 29, wherein the axes of the apertures are oriented approximately parallel to the longitudinal direction of the carriage.

The lower prism half 151 has an offset section 156, which is relatively thin and is attached to tine 50 of carriage 11. This is performed work the aid of two connecting screws 157 and 158, which pass through tine 50 and are screwed in to section 156 of the lower prism half 151. These screws 157 and 158 lie approximately symmetrical to the longitudinal axis of the carriage 11. The second of these screws 158 is also shown in FIG. 29. In practice, it is sometimes necessary to correct very finely the position of prism 150 relative to the carriage 11. This is achieved with the aid of four set screws 159, which lie outside the region extending between the two fastening screws 157 and 158. The set screws 159 are screwed into the tapped holes 55 in the tine 50 (FIG. 29) and when they are tigthened, they exert pressure on the upper side of the thin part 156 of the prism head 150. By tightening or loosening the appropriate set screw 149, without moving the fastening screws 157 and 158, a very fine adjustment of the prism 150 relative to the carriage 11 is achieved.

Figure 28:
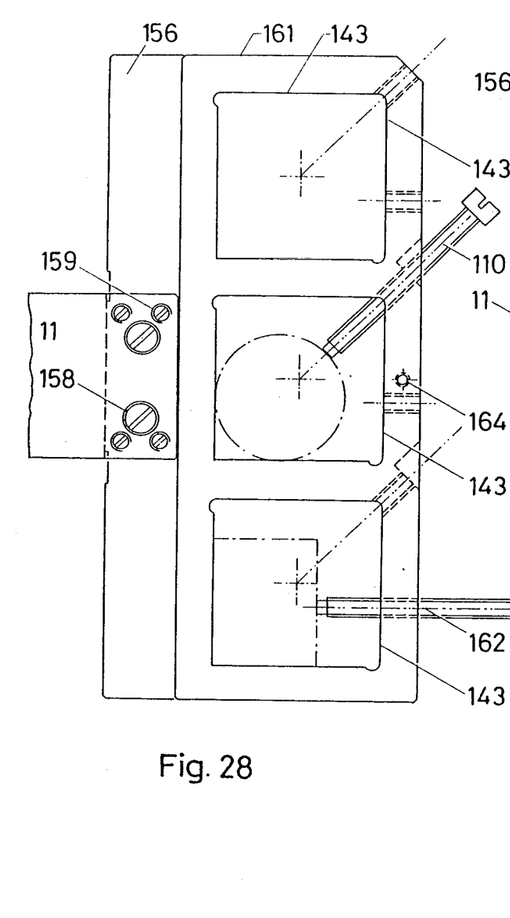
FIG. 28 shows in plan view a component having several apertures for receiving a workpiece, the axes of the apertures standing perpendicular to the longitudinal direction of the carriage.

FIGS. 28 and 29 show a further component of the apparatus, the head 161 of which exhibits three angular apertures 143 of the type described in conjunction with the component 140 according to FIGS. 25 and 26. Each of the apertures 143, whose mouths lie in a horizontal plane, has a pressing screw 110 and a fixing screw 162 assigned to it. The head likewise exhibits a thin part 156, which is attached to the carriage 11 in the same way as described in conjunction with FIG. 27. The front web 163 of the head 161 is provided with a reference point 164. This may be an elevation 164 from the surface of the head 161, the vertex of which is at a previously known distance from the axis of the carriage or of the shank. Initiated by the numerical controls, the tool holder of the machine can always first move to this reference point 164, where it fixes the coordinates of the origin for its coordinate system in the machining of the particular workpiece.

In the case of the component of the apparatus according to FIG. 30, the head 161 is likewise provided with several apertures 166 for receiving workpieces. The mouths of these apertures 166 lie, however, in a vertical plane. This components is secured on carriage 11 in the manner already described and it likewise has a reference point 164.

Figure 31:
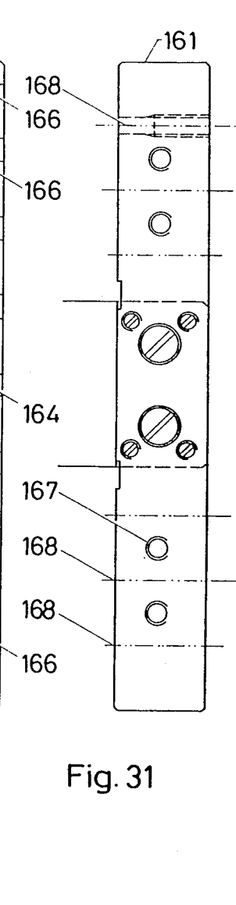
FIG. 31 shows in plan view a component approximately as in FIG. 4, the end face of the plate also exhibiting tapped holes for fastening a workpiece.

The lead 161 of the component according to FIG. 31 has tapped holes 167 with a vertical axis and tapped holes 168 with a horizontal axis. Screws for holding the workpiece can be screwed into these holes 167 and 168.

Figure 32:
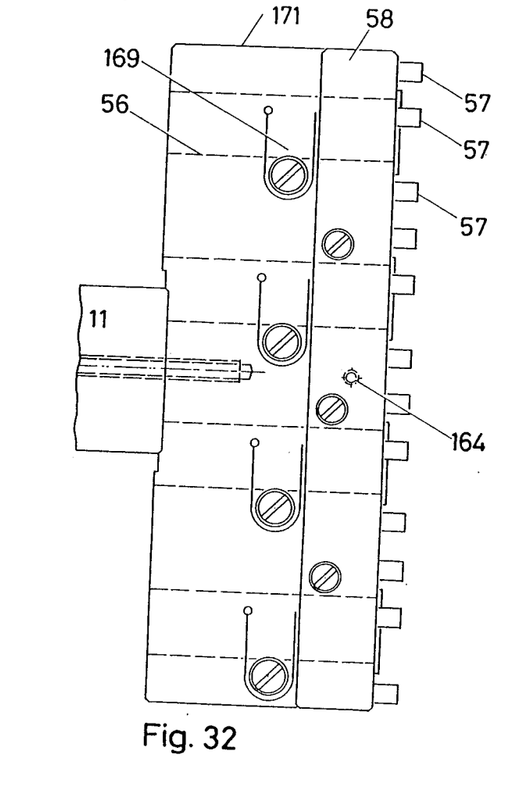
FIG. 32 shows in plan view a component in which the holder secured to the carriage has several apertures for receiving the shank of a further component of the apparatus.
Figure 33:
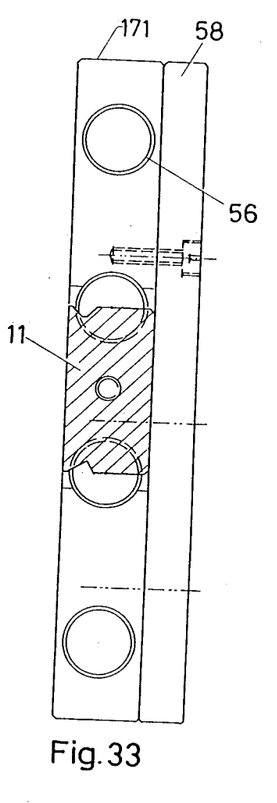
FIG. 33 shows a rear view of the component of FIG. 32.

The component shown in FIGS. 32 and 33 has a head 171, which has apertures 56 for receiving the shank 165 of another component. These apertures 56 lies in a row, to be precise on either side of the carriage 11, which is attached to the head 171 allowing for the possibility of a fine setting. Over the entire length of the head extends the plate 58, already described in conjunction with FIG. 5. Assigned to the respective aperture 56 are stop pins 57 for the pin 165 on the shank 160, which have likewise already been described. Serving the clamping of the shank in the respective aperture 56 are tongues 169, which are described in more detail in an earlier Swiss patent application No. 6799/83 filed by the same applicant.

Figure 34:
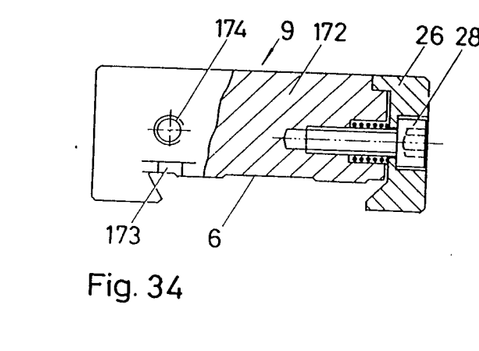
FIG. 34 shows partially in vertical section a stop which can be attached on the beam as shown in FIG. 1.
Figure 35:
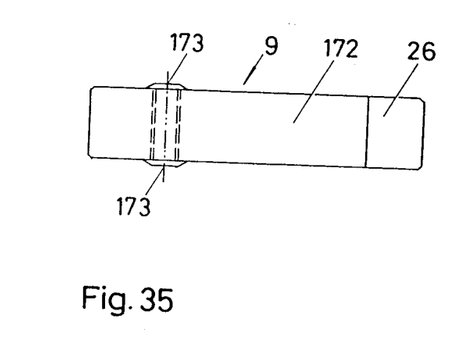
FIG. 35 shows in plan view the component of FIG. 34.

A further component 9 can be mounted on the beam 2 (FIG. 1), which component serves as a stop for further components mounted on the beam, in order to be able to position them quickly and accurately on beam 2. The underside of the body 172 of this stop 9 has previously described recess 6, in which the profiled part of the beam 2 can be located. Secured with the aid of the screw 28 on the side of the body 172 of the stop 9 is pawl 26. The lateral faces of the body 172 have at least one projection 173, the vertex surface 175 of which lies perpendicular to the longitudinal direction of the beam 2 and is as flat as possible. The lateral faces of the body 172 can also contain tapped holes 174, in which any possible helical distance pieces (not shown) can be screwed.

What is claimed is:

1. An apparatus for holding an object in a desired position in space, comprising:
   a horizontal beam affixed to a machine table by legs, said horizontal beam having an upper surface and two side surfaces, said side surfaces having mutually opposed angled grooves formed therein;
   a first L-shaped second component having a first horizontal body portion and a first depending vertical leg portion, the first horizontal body portion having an elongated recess formed therein which defines a bottom wall and two lateral walls, wherein the bottom wall rests on the upper surface of the horizontal beam, one lateral wall is angled with respect to the bottom wall so as to engage one groove of the beam, and the other lateral wall is essentially perpendicular to the bottom wall, said first horizontal body portion further having a depression and a pawl located therein, the pawl having a nose which projects from the other lateral wall to engage the other groove of the beam, the first vertical leg portion having an elongated recess formed therein which defines a second bottom wall and two second lateral walls, one second lateral wall being inclined with respect to the second bottom wall and the other second lateral wall being essentially perpendicular thereto, the first vertical leg portion further having a second depression and a second pawl located therein, the second pawl having a second nose which projects from the other second lateral wall of the first vertical leg portion;
   a second L-shaped second component having a second horizontal body portion and a second depending vertical leg portion, the second vertical leg portion having two side surfaces with mutually opposed grooves formed therein, one groove being engageable with the inclined second lateral wall and the other groove being engageable with the second nose, the second horizontal body portion having an elongated recess formed therein which defines a third bottom wall and two third lateral walls, one third lateral wall being inclined with respect to the third bottom wall and the other third lateral wall being essentially perpendicular thereto, the second horizontal body portion further having a third depression and a third pawl located therein, the third pawl having a third nose which projects from the other third lateral wall of the second horizontal body portion; and
   a first component for supporting the object, comprising a carriage having two side walls, said side walls having mutually opposed grooves formed therein, one groove being engageable with the third inclined wall and the other groove being engageable with the third nose.

2. An apparatus as claimed in claim 1, wherein said horizontal beam, second vertical leg portion, and first component each have an axis, said axes being essentially mutually perpendicular to each other.

3. The apparatus of claims 1, wherein said first component comprises a carriage and a device to receive the object located at an end of said carriage.

4. The apparatus of claim 1, wherein said first component further comprises a carriage and an axially oriented aperture located in an end part of said carriage for receiving a circular shank of a further component and said carriage and part being provided with a detachable plate which carries a stop pin for said circular shank.

5. The apparatus of claim 4, wherein said further component having the shank has an articulate basic element which adjoins the shank, and the basic element comprises at least one prism which is bridged by a yoke.

6. The apparatus of claim 5, wherein the supports of said prism are arranged so that the axis of the shank is oriented parallel or through the surface of one of the support surfaces of the prism, and the surface of the other support of the prism is placed at right angles thereto.

* * * * *